United States Patent
Smith-Taylor et al.

(10) Patent No.: US 10,435,901 B1
(45) Date of Patent: Oct. 8, 2019

(54) CHEMICAL DISPENSING APPARATUS

(71) Applicants: Damian Shaun Smith-Taylor, Warrensburg, MO (US); Kevin Eugene Konnis, Phoenix, AZ (US)

(72) Inventors: Damian Shaun Smith-Taylor, Warrensburg, MO (US); Kevin Eugene Konnis, Phoenix, AZ (US)

(*) Notice: Subject to any disclaimer, the term of this patent is extended or adjusted under 35 U.S.C. 154(b) by 0 days.

(21) Appl. No.: 16/240,541

(22) Filed: Jan. 4, 2019

(51) Int. Cl.
| | |
|---|---|
| *B01D 11/02* | (2006.01) |
| *E03B 11/00* | (2006.01) |
| *F16K 15/14* | (2006.01) |
| *B01D 24/46* | (2006.01) |
| *E04H 4/12* | (2006.01) |
| *C02F 1/68* | (2006.01) |
| *C02F 103/42* | (2006.01) |

(52) U.S. Cl.
CPC ............ *E04H 4/1281* (2013.01); *C02F 1/688* (2013.01); *C02F 2103/42* (2013.01)

(58) Field of Classification Search
CPC .. A61L 2/0088; A61L 2/18; C02F 1/00; C02F 11/00; C02F 220/00; B05B 11/0013; B05B 11/0038; B05B 11/00412
USPC ................ 422/261, 278, 274; 137/268, 845; 210/198.1, 206, 754, 450
See application file for complete search history.

(56) References Cited

U.S. PATENT DOCUMENTS 3,765,534 A * 10/1973 West .................... E04H 4/1272
                                                                  210/167.11

* cited by examiner

*Primary Examiner* — Monzer R Chorbaji
(74) *Attorney, Agent, or Firm* — Donna Denise Mashburn Chapman; Mashburn Law Office, LLC

(57) ABSTRACT

A chemical dispensing system broadly including a mounting ring and a dispenser apparatus. The mounting ring securely attaches the dispenser apparatus to a water return jet in a swimming pool or spa. The dispenser apparatus broadly includes a connector ring, a screen, a housing, and an adjustable basket. The connector ring fastens the dispenser apparatus to the mounting ring. The screen is removably attached to the housing. The adjustable basket nests inside the housing and includes a tab that protrudes through the housing sidewall. The tab is used to rotate the adjustable basket within the housing, thereby regulating the sanitizing chemical dispersal rate. Pressurized water from the return jet flows across the surface of the screen, creating an upward-rising current within the dispenser apparatus. The sanitizing chemicals in the adjustable basket dissolve as the water flows upward through and exits through the screen of the dispensing apparatus.

13 Claims, 5 Drawing Sheets

CHEMICAL DISPENSING APPARATUS

FIELD OF INVENTION

Embodiments of the present invention relate generally to the field of chemical dispensing systems that function to treat a body of water. More specifically, the present invention relates to chemical dispensing systems that disperse one or more sanitizing chemicals in a swimming pool or a spa.

SUMMARY

The present invention is a chemical dispensing system including a mounting ring and a dispenser apparatus. The mounting ring securely attaches the dispenser apparatus to a water return jet in a swimming pool or spa. The mounting ring includes grip ridges, internal thread, and two or more attachment apertures. The dispenser apparatus broadly includes a connector ring, an intake screen, a housing, and an adjustable basket. The adjustable basket nests inside the housing and contains one or more sanitizing chemicals. The adjustable basket may be rotated within the housing to regulate sanitizing chemical dispersal rate.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
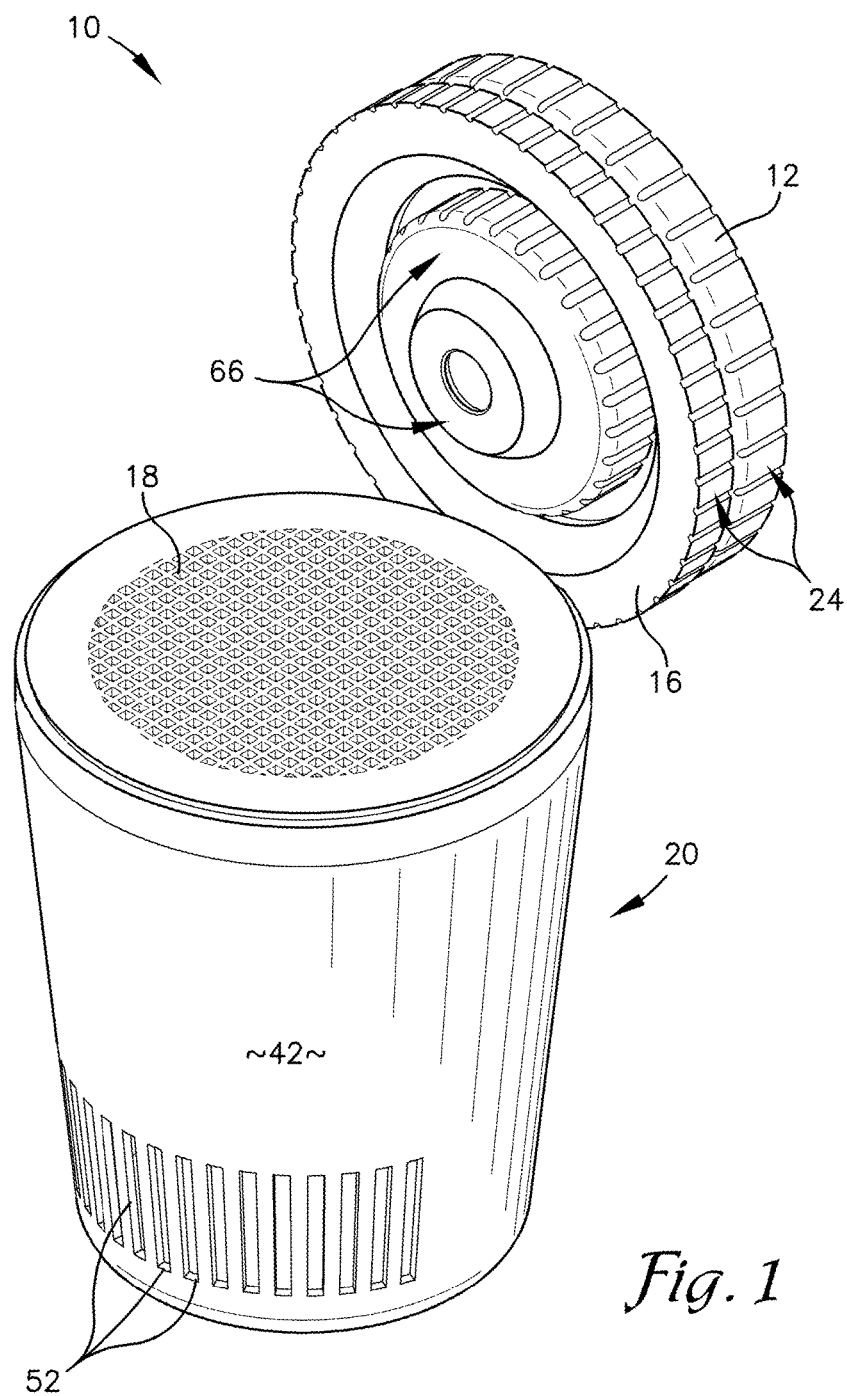
FIG. 1 is a perspective view of a chemical dispensing system attached to a return jet, constructed in accordance with an embodiment of the present invention.
Figure 2:
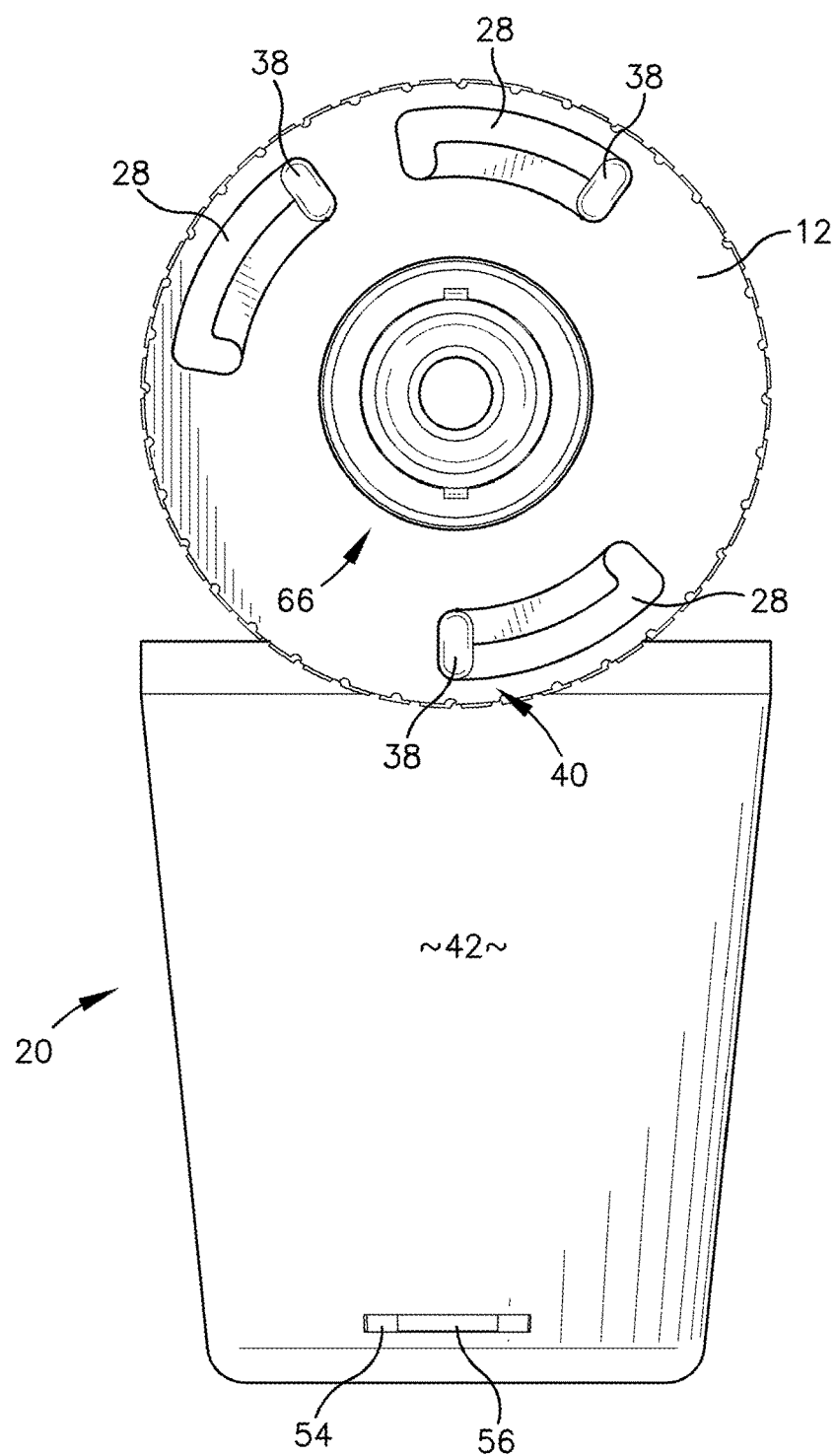
FIG. 2 is a perspective view of the back of the chemical dispensing system shown in FIG. 1, constructed in accordance with an embodiment of the present invention.
Figure 4:
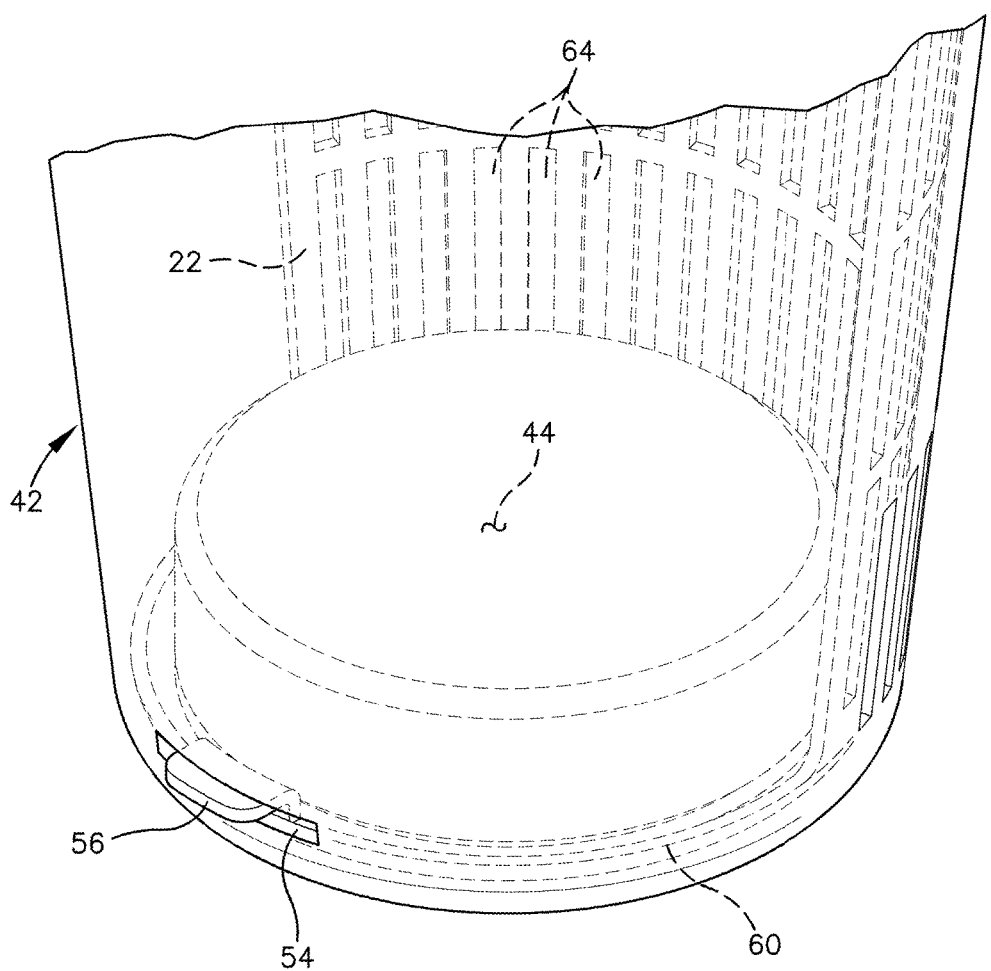
Figure 5:
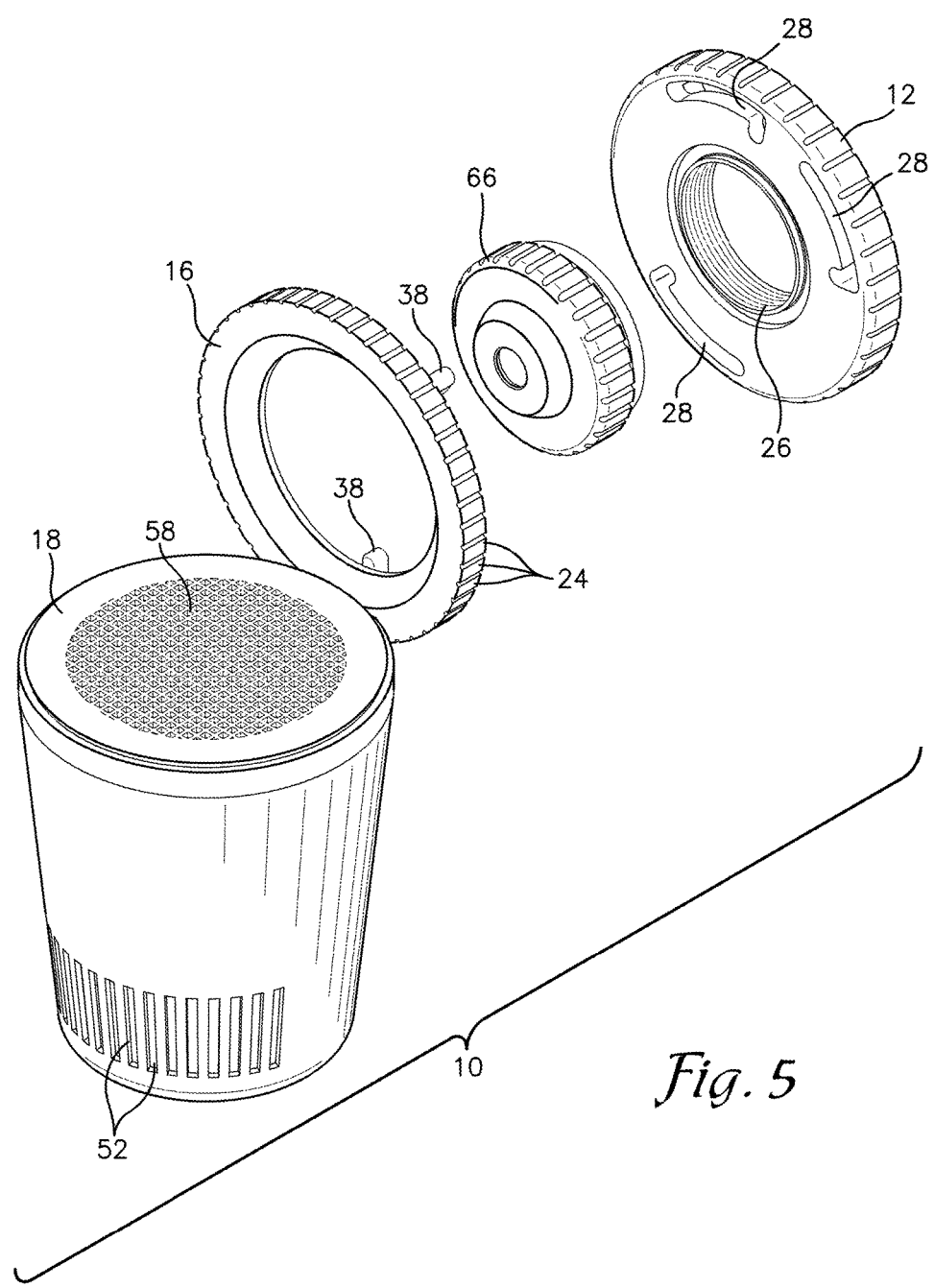

FIG. 4 is a cutaway view showing the interior structures of the adjustable basket and the housing of the chemical dispensing system of FIG. 1, constructed in accordance with an embodiment of the present invention; and FIG. 5 is an exploded view of a mounting ring, the outer fittings of a return jet, and the dispenser apparatus of FIG. 1, constructed in accordance with another embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-5, a chemical dispensing system 10 constructed in accordance with an embodiment of the present invention is illustrated. The chemical dispensing system 10 broadly includes a mounting ring 12 and a dispenser apparatus 14. The dispenser apparatus 14 broadly includes a connector ring 16, a screen 18, a housing 20, and an adjustable basket 22. The components of the chemical dispensing system 10 may be made of natural or synthetic materials, e.g., metal, nylon, plastic, or any suitable material or combination of materials.

The mounting ring 12 is installed on a return jet located in a swimming pool or spa. The mounting ring 12 may include grip ridges 24, internal threads 26, and two or more attachment apertures 28. The grip ridges 24 are located on the outside periphery of the mounting ring 12 and provide friction during installation. As described in greater detail below, the internal threads 26 may allow the user to attach or remove the mounting ring 12 to complimentary threads located on a return jet. In another embodiment, the mounting ring 12 does not include internal threads 26 and the inside surface of the mounting ring 12 is smooth. The two or more attachment apertures 28 of the mounting ring 12 are used to join the dispenser apparatus 14 to the mounting ring 12.

Figure 3:
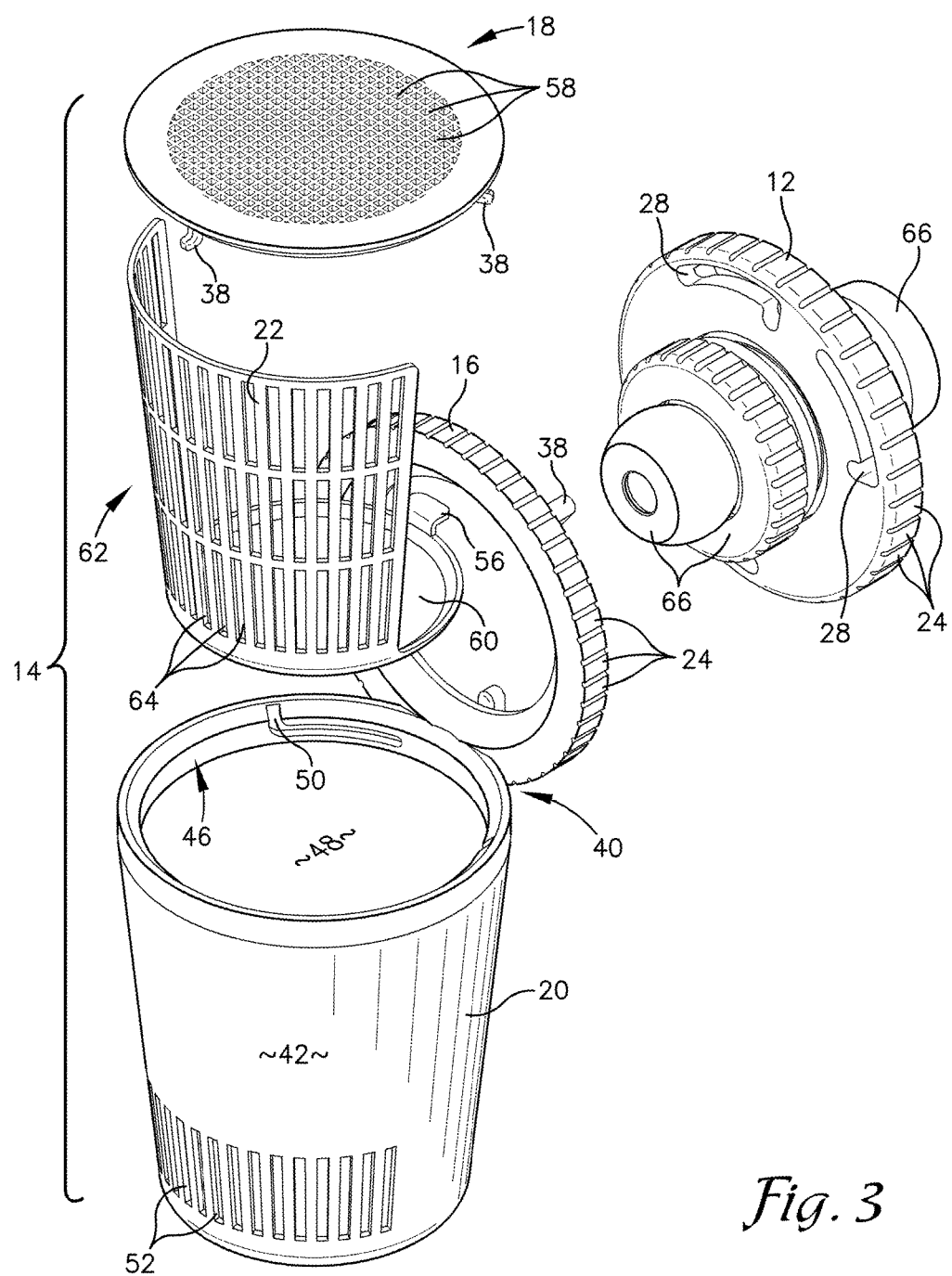
FIG. 3 is an exploded view of the chemical dispensing system of FIG. 1, constructed in accordance with an embodiment of the present invention.

The dispenser apparatus 14 fastens to the mounting ring 12 and broadly comprises a connector ring 16, a housing 20, a screen 18, and an adjustable basket 22. The connector ring 16 includes grip ridges 24, at least two stop catches 38, and an attachment point 40. As best seen in FIGS. 3 and 5, each stop catch 38 projects outwardly from the connector ring 16. During installation, the stop catches 38 are inserted into the attachment apertures 28 of the mounting ring 12, and the connector ring 16 is rotated to couple the connector ring 16 to the mounting ring 12. The connector ring 16 is attached to the housing 20 at the attachment point 40. In one embodiment, the connector ring 16 and the housing 20 may be separate components connected at the attachment point 40 by various fasteners (e.g., screws), or adhesives. In another embodiment, the connector ring 16 and the housing 20 are unitarily formed from extruded metal or plastic material.

The housing 20 is generally cylindrical and includes a sidewall 42, an interior bottom surface 44, an upper edge 46, an interior chamber 48, at least two locking recesses 50, one or more intake apertures 52, and a slot 54. The upper edge 46 of the housing 20 defines an opening. The locking recesses 50 are tracks, located near the upper edge 46 of the housing 20, that secure the screen 18 over the housing 20 opening. Water exiting the return jet flows across the upper surface of the screen 18 to create an upward-rising current within the dispenser apparatus.

The contour of the interior bottom surface 44 of the housing 20 may vary. For example, in one embodiment, the interior bottom surface 44 may be generally flat. In another embodiment, as shown in FIG. 4, the middle portion of the interior bottom surface 44 may be raised.

The intake apertures 52 and the slot 54 are located in the sidewall 42 of the housing 20. The number, shape, and arrangement of the intake apertures 52 in the housing 20 may vary. For example, as shown in FIG. 1, the intake apertures 52 may be a single row of narrow vertical slits located along one side and near the bottom of the sidewall 42. In another embodiment, the housing 20 may have two or more rows of intake apertures 52 that partially or completely encompass the sidewall 42 of the housing 20. The slot 54 is an opening in the sidewall 42 located near the bottom of the housing 20. As explained further below, the slot 54 receives the tab 56 of the adjustable basket 22. The tab 56 position is adjustable to regulate the release of sanitizing agent out of the dispenser apparatus 14.

The screen 18 attaches to the housing 20 and includes at least two stop catches 38, and chemical exit openings 58. The screen 18 prevents debris from entering the housing 20. The screen 18 is a flat disk that is removeably attached to the upper edge 46 of the housing 20 by inserting each stop catch 38 into a complimentary locking recess 50 of the housing 20 and rotating the screen 18. The size, shape, and arrangement of the chemical exit openings 58 vary. For example, as shown in FIG. 1, the chemical exit openings 58 may be square. In other embodiments, the chemical exit openings 58 may be circular, oval, etc.

The adjustable basket 22 nests within the interior chamber 48 of the housing 20 and includes a base 60, a tab 56, and a perimeter wall 62. One or more sanitizing chemicals may be positioned inside the adjustable basket 22. The shape of the base 60 of the adjustable basket 22 may vary. As shown in FIG. 3, the base 60 of the adjustable basket 22 may be disk-shaped having a raised perimeter edge. In this embodiment, the tab 56 protrudes outwardly from and is attached to the raised perimeter edge. In another embodiment, as shown in FIG. 4, the base 60 may be a ring shape that includes a tab 56 that protrudes from and is attached to the ring. The height and shape of the perimeter wall 62 may also vary and include one or more rows of openings 64. The shape, number, and size of the openings 64 in the adjustable basket 22 may vary. In one embodiment, as shown in FIG. 3, the adjustable basket 22 may have three rows of slit-shaped openings 64. In another embodiment, the adjustable basket 22 may be cup-shaped and include a single row of slit-shaped openings 64 around the perimeter of the adjustable basket 22. Those who are skilled in the art may envision other adjustable basket 22 embodiments without departing from the scope of the present invention.

The tab 56 of the adjustable basket 22 protrudes through the slot 54 located in the sidewall 42 of the housing 20. The slot 54 may be wider than the tab 56 to permit movement of the tab 56 from side-to-side. The tab 56 position within the slot 54 is a means to regulate the amount of sanitizing chemical released from the dispensing apparatus 14. To control the amount of sanitizing chemical delivered to a body of water, the user selectively rotates the adjustable basket 22 within the housing 20 by sliding the tab 56 within the slot 54 to the desired position. For example, in one embodiment, the openings 64 in the adjustable basket 22 may be aligned with the intake apertures 52 of the housing 20 in a full open position to provide maximum release of sanitizing chemical. In another embodiment, the adjustable basket 22 may be rotated to partially align the openings 64 in any intermediate position with the intake apertures 52 to regulate the release of sanitizing chemical. In yet another embodiment, to terminate the release of sanitizing chemical, the adjustable basket 22 may be rotated to completely close the intake apertures 52, thereby stopping water ingress into the dispensing apparatus 14.

The screen 18 may be removed from the housing 20 to position various kinds of water-soluble sanitizing chemicals inside the adjustable basket 22. For example, pellets, briquettes, tablets, or granules made of water treatment chemicals, e.g., calcium hypochlorite compositions, that slowly dissolve when submerged underwater may be placed inside the adjustable basket 22. The screen 18 is reattached to the housing 20 to retain the sanitizing chemicals inside the adjustable basket 22 and the housing 20.

As the water from the return jet flows across the surface of the screen 18, water from the pool or spa is drawn into the dispenser apparatus 14 through the housing 20 intake apertures 52 where it flows into the adjustable basket 22 through the openings 64. Sanitizing chemicals are dissolved in the water as it flows upward through the dispensing apparatus 14. The chemically treated water exits the dispensing apparatus 14 through the chemical exit openings 58 in the screen 18 and mixes with pressurized water exiting the return jet. The treated water mixture is efficiently circulated throughout the swimming pool or spa. When the sanitizing chemical inside the adjustable basket 22 becomes depleted, the user rotatably removes the screen 18, places more sanitizing chemical inside the adjustable basket 22, and reattaches the screen 18 to the housing 20.

Turning now to FIGS. 3 and 5, the installation of the chemical dispensing system 10 will now be described in more detail. First, the dispenser apparatus 14 is assembled. The adjustable basket 22 is positioned inside the interior chamber 48 of the housing 20 with the tab 56 of the adjustable basket 22 protruding through the slot 54 located in the sidewall 42 of the housing 20. One or more sanitizing chemicals are placed inside the adjustable basket 22 and the screen 18 is attached to the housing 20 using a rotational locking movement. More specifically, the screen 18 is attached to the housing by inserting each stop catch 38 into a complimentary locking recess 50 located inside the housing 20, and rotating the screen 18.

Second, the mounting ring 12 is installed. As best shown in FIG. 6, the outer fittings 66 of a return jet are temporarily removed from the side of a pool or spa by rotating them counterclockwise. The mounting ring 12 is positioned around the exposed return jet opening, and the outer fittings 66 of the return jet are reattached to the side of the pool or spa with the mounting ring 12 in place. Specifically, the threads located on the outer fittings 66 are aligned with the internal threads 26 of the mounting ring 12 and reattached to the pool or spa with a rotational movement.

Third, the assembled dispenser apparatus 14 is installed. The connector ring 16 of the dispenser apparatus 14 is securely attached to the mounting ring 12 by inserting the stop catches 38 of the connector ring 16 into the attachment apertures 28 of the mounting ring 12. The connector ring 16 is rotated to couple the connector ring 16 to the mounting ring 12. After the chemical dispensing system 10 is installed, the water flow direction of the return jet may be adjusted to direct the flow of water across the screen 18 surface to create an upward-rising current within the dispenser apparatus 14.

Although the invention has been described with reference to the embodiments illustrated in the attached drawing figures, it is noted that equivalents may be employed and substitutions made herein without departing from the scope of the invention as recited in the claims. Having thus described various embodiments of the invention, what is claimed as new and desired to be protected by Letters Patent includes the following:

The invention claimed is:

1. A chemical dispensing system comprising:
    a mounting ring that includes two or more apertures and an internal thread for rotatably attaching the mounting ring to a water return jet; and
    a dispenser apparatus comprising:
        a connector ring that includes at least two stop catches that outwardly project from the connector ring and the stop catches may be rotatable inserted into the two or more apertures of the mounting ring to fasten the connector ring to the mounting ring;
        a screen that includes at least two stop catches and chemical exit openings for water egress;
        a housing that includes a slot; and
        an adjustable basket that includes a base, a tab, a perimeter wall, and one or more rows of openings in the perimeter wall.

2. The chemical dispensing system of claim 1, wherein the connector ring is secured to the housing at an attachment point.

3. The chemical dispensing system of claim 1, wherein the housing includes a sidewall, an interior bottom surface, an interior chamber, at least two locking recesses, and one or more intake apertures.

4. The chemical dispensing system of claim 3, wherein the at least two locking recesses are tracks located inside the housing that secure the screen to the housing.

5. The chemical dispensing system of claim 3, wherein a portion of the interior bottom surface of the housing is raised.

6. The chemical dispensing system of claim 3, wherein the one or more intake apertures are a row of vertical slits located in the sidewall of the housing.

7. The chemical dispensing system of claim 3, wherein the stop catch of the screen is configured to be attached by insertion into and rotation within the locking recess of the housing.

8. The chemical dispensing system of claim 1, wherein chemical exit openings for water egress are square.

9. The chemical dispensing system of claim 1, wherein the screen is a flat disk that may be rotatably attached to the housing.

10. The chemical dispensing system of claim 1, wherein the base of the adjustable basket is ring-shaped.

11. The chemical dispensing system of claim 1, wherein the one or more rows of openings are vertical slits located in the perimeter wall of the adjustable basket.

12. A chemical dispensing system comprising:
    a mounting ring that includes two or more apertures and an internal thread for rotatably attaching the mounting ring to a water return jet; and
    a dispenser apparatus comprising:
        a connector ring that includes at least two stop catches that outwardly project from the connector ring and the stop catches may be rotatably inserted into the two or more apertures of the mounting ring to fasten the connector ring to the mounting ring;
        a screen that includes at least two stop catches and chemical exit openings for water egress;
        a housing that includes at least two locking recesses and a slot,
            wherein the at least two locking recesses are tracks located inside the housing that secure the screen to the housing; and
        an adjustable basket that includes a base, a tab, a perimeter wall, and one or more rows of openings in the perimeter wall.

13. A chemical dispensing system comprising:
    a mounting ring that includes two or more apertures and an internal thread for rotatably attaching the mounting ring to a water return jet; and
    a dispenser apparatus comprising:
        a connector ring that includes at least two stop catches that outwardly project from the connector ring and the stop catches may be rotatably inserted into the two or more apertures of the mounting ring to fasten the connector ring to the mounting ring;
        a screen that includes at least two stop catches and chemical exit openings for water egress;
        a housing that includes a slot; and
        an adjustable basket that includes a base, a tab, a perimeter wall, and one or more rows of openings located in the perimeter wall,
            wherein the tab protrudes through the slot of the housing and the tab may be moved side-to-side within the slot to change the position of the adjustable basket.

* * * * *